US011562412B2

(12) United States Patent
Peter et al.

(10) Patent No.: US 11,562,412 B2
(45) Date of Patent: *Jan. 24, 2023

(54) INSTANT GENERATION AND USAGE OF HTTP URL BASED UNIQUE IDENTITY FOR ENGAGING IN MULTI-MODAL REAL-TIME INTERACTIONS IN ONLINE MARKETPLACES, SOCIAL NETWORKS AND OTHER RELEVANT PLACES

(71) Applicant: Ushur, Inc., Santa Clara, CA (US)

(72) Inventors: Henry Thomas Peter, Mountain House, CA (US); Dayanand Narasimha, Santa Clara, CA (US); Simha Sadasiva, San Jose, CA (US)

(73) Assignee: Ushur, Inc., Santa Clara, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/927,663

(22) Filed: Jul. 13, 2020

(65) Prior Publication Data

US 2020/0342510 A1    Oct. 29, 2020

Related U.S. Application Data

(63) Continuation of application No. 14/607,034, filed on Jan. 27, 2015, now Pat. No. 10,713,698.

(Continued)

(51) Int. Cl.
*G06Q 30/00* (2012.01)
*G06Q 30/06* (2012.01)
(Continued)

(52) U.S. Cl.
CPC ..... *G06Q 30/0613* (2013.01); *G06F 16/9558* (2019.01); *G06F 16/9566* (2019.01);
(Continued)

(58) Field of Classification Search
CPC .............. G06Q 30/0613; G06Q 50/01; G06Q 30/0615; G06Q 30/01; H04L 67/02;
(Continued)

(56) References Cited

U.S. PATENT DOCUMENTS 6,085,242 A    7/2000 Chandra
6,898,631 B1   5/2005 Kraft et al.
(Continued)

OTHER PUBLICATIONS

Brown, Jo; Amanda J. Broderick; Nick Lee; Word of mouth communication within online communities: Conceptualizing the online social network, Journal of Interactive Marketing, vol. 21, Issue 3, 2007, pp. 2-20, https://doi.org/10.1002/dir.20082. (Year: 2007).

(Continued)

*Primary Examiner* — Anand Loharikar
(74) *Attorney, Agent, or Firm* — Lowenstein Sandler LLP; Madhumita Datta

(57) ABSTRACT

A User Engagement System (UES) has mechanism to allow a provider of a product or service to sign up with basic identity information along with any service description resulting in an instant URL as a means for outside parties to contact this provider and engage in multi-modal interactions involving voice, video, chat and media sharing. A single user or a group of users can sign up with this system and provide optionally some contact information such as phone numbers. An URL is instantly generated that can be advertised as hyperlinks to the outside environment such as on a website, email or any other means. This URL can be advertised by the system in various online marketplaces or social networks of the provider as well as on the web to be identified by search engines.

20 Claims, 14 Drawing Sheets

Related U.S. Application Data

(60) Provisional application No. 61/932,170, filed on Jan. 27, 2014.

(51) Int. Cl.
   *H04L 67/02*    (2022.01)
   *G06Q 50/00*    (2012.01)
   *G06F 16/955*   (2019.01)
   *H04L 51/046*   (2022.01)
   *H04W 4/14*     (2009.01)
   *H04L 51/52*    (2022.01)

(52) U.S. Cl.
   CPC ......... *G06Q 30/01* (2013.01); *G06Q 30/0615* (2013.01); *G06Q 50/01* (2013.01); *H04L 51/046* (2013.01); *H04L 67/02* (2013.01); *H04L 51/52* (2022.05); *H04W 4/14* (2013.01)

(58) Field of Classification Search
   CPC ... H04L 51/046; H04L 51/52; G06F 16/9558; G06F 16/9566; H04W 4/14
   USPC ................................. 705/26.1–27.2
   See application file for complete search history.

(56) References Cited

U.S. PATENT DOCUMENTS

| | | |
|---|---|---|
| 2004/0064351 A1 | 4/2004 | Mikurak |
| 2006/0026237 A1* | 2/2006 | Wang ............... H04L 51/36 709/217 |
| 2009/0175331 A1 | 7/2009 | Karczewicz et al. |
| 2011/0035687 A1 | 2/2011 | Katis |
| 2012/0297031 A1 | 11/2012 | Danielsson |
| 2013/0080362 A1 | 3/2013 | Chang et al. |
| 2013/0290532 A1 | 10/2013 | Richardson et al. |
| 2014/0257929 A1 | 9/2014 | Du et al. |
| 2014/0278783 A1 | 9/2014 | Du |
| 2014/0288945 A1 | 9/2014 | Boerner et al. |
| 2015/0221007 A1 | 8/2015 | Peter et al. |
| 2015/0339745 A1 | 11/2015 | Peter et al. |
| 2017/0195337 A1 | 7/2017 | Peter et al. |
| 2018/0342000 A1 | 11/2018 | Peter et al. |

OTHER PUBLICATIONS

Kietzmann JH, Hermkens K, McCarthy IP, Silvestre BS. Social media? Get serious! Understanding the functional building blocks of social media. Business Horizons 2011 ;54(3) :241-251. (Year: 2011).

* cited by examiner

| User Device | Provider Device | Possible Media | Reference |
|---|---|---|---|
| Desktop/Laptop/ Smart Device Browser | Desktop/Laptop/ Browser | Text, Voice, Video (Webcam), Video Streaming, Media Sharing | 201 |
| Desktop/Laptop/ Smart Device Browser | Smart Device Browser | Text, Voice, Video (Webcam), Video Streaming, Media Sharing | 202 |
| Desktop/Laptop/ Smart Device Browser | Smart Device App | Text, Voice, Video (Webcam), Video Streaming, Media Sharing | 203 |
| Desktop/Laptop/ Smart Device Browser | Mobile/Other Device with SMS and Voice | Text, Voice | 204 |
| Desktop/Laptop/ Smart Device Browser | Landline Phone Device | Voice | 205 |

FIG. 2

CL > SF bay area > south bay > for sale / wanted > cars & trucks - by owner

[Reply]

Great looking Volkswagen Hatchback - $10,000 (campbell)

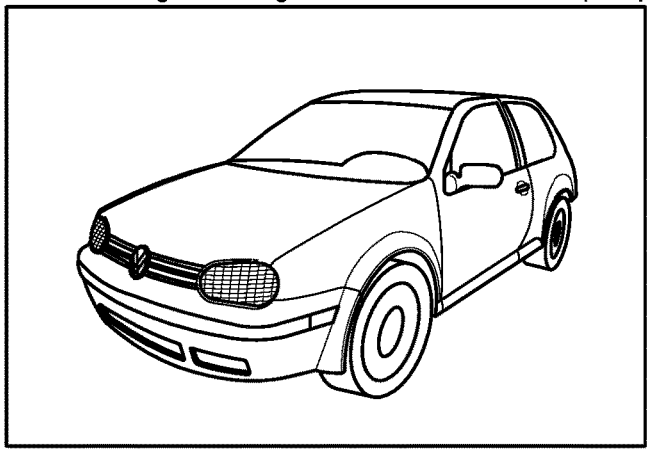

[2005 Volkswagen gti]

I am selling 8-year-old car. This is a single owner car and has been very well maintained. It is in excellent condition. I need to sell this car as I need to upgrade to a fan with a growing family. This car has low mileage and has been mostly used to commute back and forth from work. Pets have not been transported in this car and no one has ever smoked in the car.

Exterior Features:
roof and glass speed sensitive wipers, rear defogger, intermittent rear wiper, power glass sunroof, tires and wheels alloy wheels 15 x 6.1 in. Wheels steel spare wheel 195/65R H tires all season rooms full-size matching spare tire safety features four-wheel ABS frost and rear had airbags dual front side mounted airbags child seat anchors anti-theft alarm system ventilated front desk / solid rear disc brakes daytime running lights engine immobilizer frost fog/driving lights to front headlights three rear headrests rear center three point belt front seat belt pretensioners traction control electronic brake force distributions emergency interior trunk release Contact me by clicking here: ⸺702

( https://www.ushur.me/connect?MjcsMQ== )

- it's NOT ok to contact this poster with services or other comments

INSTANT GENERATION AND USAGE OF HTTP URL BASED UNIQUE IDENTITY FOR ENGAGING IN MULTI-MODAL REAL-TIME INTERACTIONS IN ONLINE MARKETPLACES, SOCIAL NETWORKS AND OTHER RELEVANT PLACES

CROSS-REFERENCE TO RELATED APPLICATION

This application is a continuation of U.S. application Ser. No. 14/607,034, filed Jan. 27, 2015, which claims the benefit of U.S. Provisional Application No. 61/932,170, filed Jan. 27, 2014, the entireties of which are incorporated herein by reference.

BACKGROUND OF THE INVENTION

Field

In general this invention is related to online initiated real-time interactions where any user online might interact with one or more users who are also online. This can be via various medium such as chats, voice call, video call and occur either in a specific user-based community or in a social network context. This invention is specifically related to allowing consumers/buyers who are online, to instantly engage in real-time interactions with providers of any service who may or may not be online. In this mode of interaction, the buyers and sellers are not subscribed to any specific common entity or community to communicate with each other.

Use of Terms

The terms—buyers, users and consumers are used interchangeably and refer to the same or similar entity. The terms—sellers, providers, producers are also used interchangeably and refer to the same or similar entity. Depending on the type of the online marketplace or social network or e-commerce website, these terms are changed as relevant in those contexts. As an example, an online dating site uses the term users to refer to its user base who are trying to connect with others. An online auction site would use the terms buyers and sellers. An online marketplace connecting growers and bakers may use the term producers and consumers to its user community. This invention is applicable to similar users and not limited by the specific terms used to describe the users of the proposed system.

DESCRIPTION OF THE RELATED ART

Marketplaces on the internet provide an environment where sellers of a service or a product can advertise their offering and prospective buyers can read through the description of these products (examples like AMAZON, EBAY, CRAIGNSLIST) and contact the sellers for further inquiries. In these marketplaces the most common mode of interaction is via email. In some cases the seller publishes their phone number with the caveat that only serious buyers should contact them. The only modes of engagement between buyers and sellers in these marketplaces are either via email where the actual email of the seller is hidden or via the published phone number that the seller has advertised. While marketplaces provide for protecting your email address, they have no such offering for protecting the privacy of the listed phone number. There have been some workarounds where sellers purchase an alias phone number from a different source and publish that in the marketplace and their actual phone numbers gets connected via this alias. However this is a very phone number centric solution and falls shorts of offering media rich (such as video and other media asset exchanges) engagements.

This kind of interaction in market places is far different than a more near real-time interaction in a group settings like social networks where all the users are members of the particular social network. Even though social real-time interaction with voice and video in these networks are evolving it still is meant for only the subscribed users of that group or network. Unless both parties wanting to interact are subscribers of the network or group, they will not be able to interact.

Currently the browser environment in the internet realm is being enhanced for real-time interactions via voice, video and data under the influence of html5. In this context, it becomes much easier to provide these media (voice, video and data) via the browser itself natively without requiring any special plugins like MICROSOFT Silverlight or ADOBE Flash Player to be downloaded or relying on a third party software application like SKYPE.

In such a growing browser environment it is common for solutions to generate dynamic URL and have group of people come into a virtual location, like a room, and collaborate. However this is again a group-centric architecture rather than what is proposed here, which is a real-time engagement based architecture allowing users who are not associated with any group to engage via a unique generated URL that points to a provider for a service or even to the service itself handled by providers. In many instances the URL itself need not be visible (can be hidden behind some visual icons) for engagement to occur.

There have been other efforts in the industry to use URL as a means to refer to user information in a repository or to generate some user relevant data dynamically, generate a unique URL and have the user access that information. In some of these the structure of the URL played a key role as well. This proposed system does not depend on any specific structure of the URL itself but rather only relies on generation of globally unique URL scheme whose implementation can be very diverse as long as the URL retains its inherently necessary attributes pointing to some location with additional information.

What is now really needed in market places that we focus here, is for users who are prospective buyers to instantly engage in real-time interactions using chat, voice and video and a combination thereof with sellers or providers of any service. What this invention proposed here, in one embodiment, is to enable providers/sellers to publish contacts for instant real-time interactions and for users to engage with them without requiring both the users/prospective buyers and sellers/providers to be in any common network or group.

SUMMARY

The embodiments presented here as part of the invention enables anyone who is interested in advertising their service (say consulting on specific areas) or a product (say a car) to be able to sign-up with the proposed system by various means, to instantly acquire a unique URL and publish that URL in any website listing or social network as a hyperlink or to communicate that URL via emails. The buyers use that hyperlink or the HTTP URL in general to instantly communicate with the sellers via chat, voice, video depending on the type of device the seller is using to interact. In one embodiment the seller can communicate via SMS from a mobile phone and can then possibly join the same interactive session using a personal computer through the proposed system so as to enhance the medium of interaction using video call. In another embodiment the buyer who first engages with the seller via a text chat can add voice to the conversation and continue to interact with both text chat and voice. In yet another embodiment the buyer and seller can also add video (webcam) to the conversation and perhaps do a live demonstration of the product. They can also share different media such as images or video streams through the proposed system.

A seller who signs-up with the proposed system will provide basic contact information such as email along with additional information such as a phone number that can be used for SMS and voice calling by the proposed system as well as any other additional information such as more phone numbers if the seller has multiple personnel to handle the interaction. In one embodiment the seller can remain signed-in into the system and handle the incoming requests directly in the browser. While in one embodiment the seller is using a browser on a personal computer to remain signed-in into the proposed system to interact with buyers, the seller can do the same interactions on a browser on a smart device such as smartphone or a tablet and use the browser.

In another embodiment the proposed system also supports a smartphone application whereby the seller can remain signed-in through the app on their smart device. Here the app embeds the capability of the browser functionality that is necessary for the voice, video and chat interactions.

In one embodiment a buyer who is on a market place site and is interested in inquiring on a specific product that is displayed there, clicks on the link that had been generated by the proposed system is directed immediately to the system and a conversation window is immediately opened through which the buyer can start interacting via chat with the seller. The identity of the seller is not exposed to the buyer and the buyer does not have to be subscribed to the system and hence the buyer is completely unknown by the system. The buyer can receive the text responses from the seller and can choose to add voice to the conversation right in the same conversation window. Here the system uses the contact information of the seller and tries to make a voice connection between the buyer and the seller. The buyer can remain on the browser and start having voice conversations with the seller without having to know the phone numbers of the seller. Whether the seller is on a desktop browser or on a smart device using a browser or on a mobile phone using SMS and normal phone call, it remains completely hidden for the buyer.

The system that is proposed here envisions all interactions by the buyer using their browser that is enabled with html5 supporting audio, video and data. However the seller can be on a browser supporting the same capabilities or can use their mobile phone or even a landline. When the seller is on a landline the proposed system is aware that seller cannot be reached via SMS and hence lets the buyer know to add voice to the conversation.

In another embodiment the URL that is generated and published by the provider can itself indicate to the system to immediately connect the user with the provider using voice since the provider does not support a SMS medium (they have only a landline phone that does not support SMS).

In another embodiment the system enables provider to configure a phone number for SMS and voice and another phone number for voice only calls. In further embodiments the provider can configure up to even 5 phone numbers and all of them will be attempted by the system. In this embodiment the conversation window will support multiple people chatting where there can be more than one person on the provider side to assist the user who is inquiring about a service or a product.

In all these embodiments the common theme which is the core of this proposed invention is the ability to instantly generate a URL, publish them via various means and for users to instantly communicate with the providers through that URL without the users having to subscribe to any network or group and does not have to be related to the provider in any way. The interactions start as anonymous engagement which can at a later stage via sharing of the information through the medium provided by the system both the providers and users can get to know each other's information if there is a need. However the system does not require this and can enable completely anonymous interactions from the start to the end on the session.

In another embodiment a seller who is interested in advertising a product on, e.g., craigslist, selects an option that is available on craigslist that allows for real-time interactions and there the seller enters contact information such as email and phone numbers and at the back-end the craigslist site uses an API (such as a REST (Representational State Transfer) API) to communicate with the proposed system, provides the information such as email and phone numbers and in response receives a URL that is presented as a hyperlink with the logo right on the site of craigslist advertisement for the provider. In this embodiment we can see that the information the provider had given is not visible on the advertisement but only the hyperlink to the proposed system. This hyperlink uniquely identifies the provider and the given contacts which is not exposed to the users visiting the craigslist advertisement.

Specifically, a User Engagement System (UES) is disclosed which shows, among other things, the following characteristics: being aware of the presence of the providers regardless of the mode through which they are present; being aware of the modes of presence of the provider such as whether through a browser or a mobile app or on a phone engaging only via SMS or engaging with the user via email; being aware of the ongoing engagements on a per session or engagement basis wherein for each engagement the above described presence and modes of presence of providers will be tracked when a user reaches the system using a URL that belongs to a provider or a group of people who jointly provide a service); and being able to use that URL and route via the most appropriate modes to the provider. The appropriate mode that is being determined is influenced by the policy configured in the system which can have a priority to route to provider on mobile app even presence on a browser or the other way around. The UES is further characterized by being able to switch the mode of engagement even in an ongoing session; for example, provider is engaging from a desktop browser initially and then through a session link arrived in email on a smart device (such as a smart mobile phone) is further able to engage and keep moving physically. Additionally, the USE is able to indicate a link to the session to the user via email that is retrieved from the user as part of the engagement and using that link the user is able to re-engage with the same provider through the system. The UES is also able to identity the modes needed even from the original URL that the user arrives at the system where the URL itself can indicate certain preferences such as voice, video or chat and then route accordingly to the provider. Other characteristics of the UES include, but are not limited to: being able to route email messages from provider to the email of the user when retrieved from the user as part of the engagement; being able to route the email messages from the provider back to the chat window of the user; being able to route the email messages from the user back to the provider's email or even chat window that the provider can be in; being able to route via SMS Gateway or Phone Gateway to reach the provider; and being able to route via Email Gateway For sending and receiving messages to and from respectively with the provider and user.

While most of the embodiments presented here are marketplaces scenarios the proposed system can be used in other situations including party events, fundraisers, and in social media advertising and also in normal conversations placing the URL for immediate contact. The proposed system with its mechanisms also are independent of the market places themselves and do not have to be tightly integrated with any marketplace systems although that is a possibility.

BRIEF DESCRIPTION OF THE DRAWINGS

FIG. 2 illustrates all the device combinations and media possibilities that are allowed by the presented invention and are addressed by various embodiments in the present invention.

FIG. 7 illustrates another possibility of using the generated HTTP URL such as within a web page in a marketplace in accordance with an embodiment of the present invention.

FIG. 10 illustrates the conversation window as part of the user engagement with the provider using the generated HTTP URL for the provider in accordance with an embodiment of the present invention.

The figures here depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The User Engagement System (UES) that is presented as invention here allows any individual or an entity (defined as a provider of a service or product) to sign-up with very basic identity information and instantly acquire a generated HTTP URL.

Through this URL the UES allows anyone on the internet in any context where this URL is displayed either explicitly or behind certain icons to engage in multi-modal interactions such as voice, video, data and media sharing with the provider of this URL.

The provider can be on the internet to engage with these interactions or can be on a phone, either mobile or landline as long as the provider has given these phone numbers with the UES. These contact information will remain hidden to the users who are engaging with the provider via the advertised URL. When the engagement of an internet user is with the provider who is on a mobile phone but only in a SMS and phone call and without internet connection, the engagement can still take place via SMS and Audio Call. In this engagement the provider is not signed-in into the UES as there is no internet connection. Even in such an engagement the internet user who is engaging via the UES does not have to do anything different than when the provider is also on the internet and is signed-in into the UES and handling the engagement via the browser.

Figure 1:
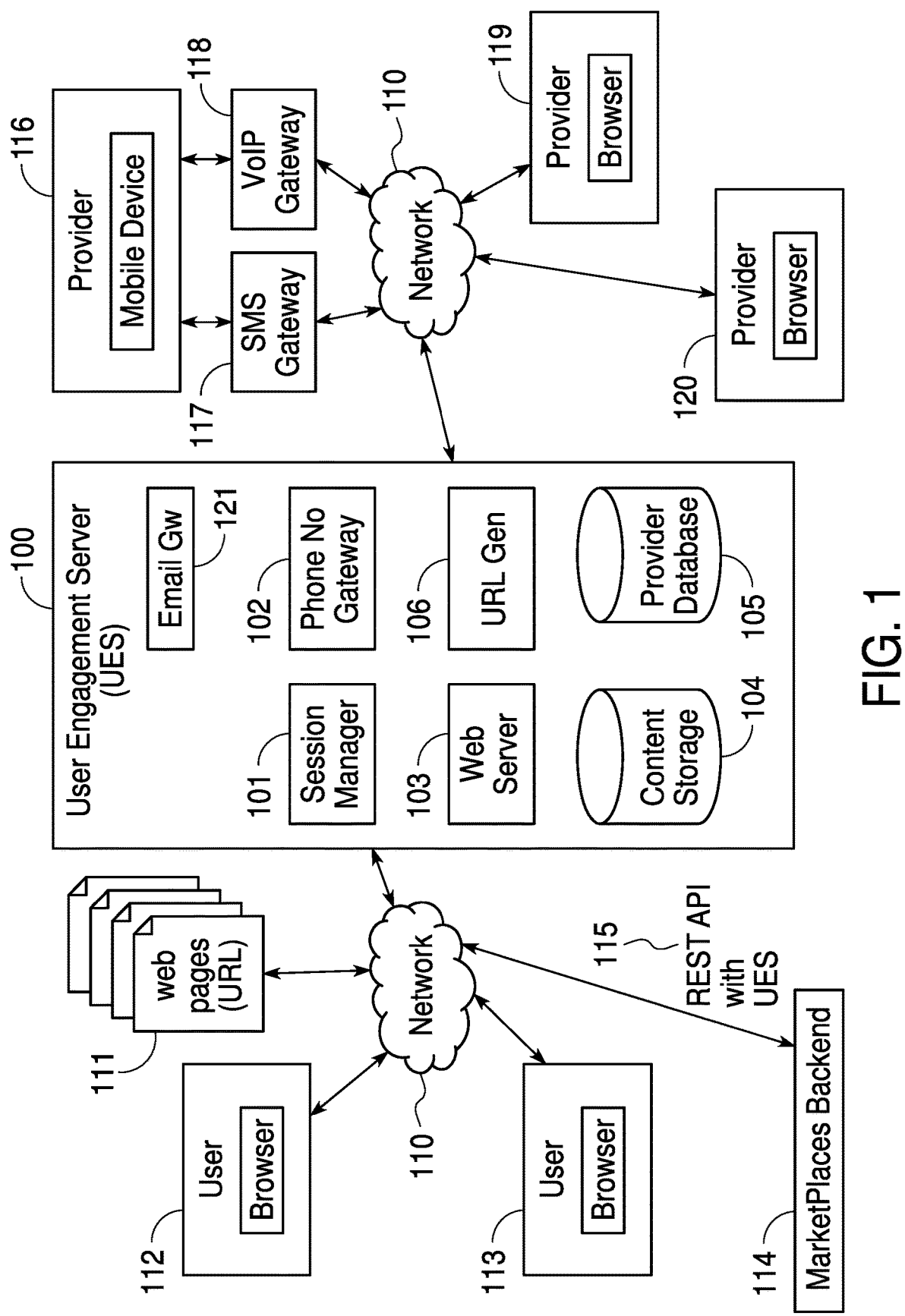
FIG. 1 illustrates all the components and aspects necessary in the system to support the invention presented here and are associated with various embodiments described in this present invention.

FIG. 1 illustrates a User Engagement Server 100 that consists of a Web Server 103 which is the first point of interaction for a provider who executes the browser 119 or 120 on a device and is able to sign-up with basic identity information and instantly able to acquire a URL from the URL Generator 106 within the UES 100 that runs on the Web Server 103. In another embodiment a provider by executing a browser 120 on a device and from a marketplace website 114 is able to acquire a URL through API 115 with the Web Server 103. In this instance the provider does not interact directly on the UES 100 site but rather is able to instantly acquire a URL so that users like 112, 113 can engage with the provider once the URL is published on the marketplace website 114. Whether the providers 119 or 120 sign-up with UES 100 directly via the UES website 103 or through an API 115 from another site 114 or 111, their information is stored in the provider database 105 and accessed on a need basis. A provider 119 or 120 who has signed-up with UES via an API 115 will be able to directly access the UES 100 and sign-in with the same identity information given via the marketplace website 114. In another embodiment, a provider 119 or 120 who already has a generated URL from UES 100 could visit any marketplace website 111 and publish directly this URL instead of sign-up via API from that site 111. To be more concrete, in the case of advertising via craigslist the provider 119 can use the interface that the marketplace site 114 provides to acquire a URL via the API 115 with the UES 100. This URL is automatically published in that marketplace advertisement. This is achieved via a integration of the UES 100 API with the marketplace website 114. In another embodiment the same provider 119 who already has acquired a URL publishes another advertisement on the same marketplace site 114 and this time does not have to use the interface to fetch a URL but can directly set the URL on the marketplace site 114. A User who is executing a browser 112 on a device visits one of the marketplace web pages 111 and wishes to contact the provider of an advertisement, clicks a URL seen on the web page 111, access the UES 100 via the network 110, the HTTP request reaches the Web Server 103, using the URL that triggered the HTTP request, the Web Server 103 looks at the Provider Database 105 and finds the URL. Once the provider 119 is identified from the database 105, a Session 101 is created for the user 112 regardless of the availability of the provider 119. Associated with the Session 101 is a conversation between user 112 and provider 119. If the provider 119 has not configured the UES 100 with a phone number and is also signed-in into the UES 100 and is not available to accept new requests, the user 112 can be immediately notified of the unavailability of the provider 119 after which the user 112 can be allowed to leave a text or voice message as per the capabilities of the UES 100 system. In one embodiment there can also be an email sent to the provider 119 using the Email Gateway 121 indicating the attempt from the user 112 assuming that the UES 100 has the ability to get a contact such as email from the user 112 as part of the established conversation. Extensions to this embodiment can involve a link to the ongoing engagement or session being sent in the email to the provider and the provider being able to use that and engage back with the user.

In another embodiment when a user 113 reaches UES 100 via a marketplace web page 111, the provider 116 is identified and in this case the provider 116 has configured a phone number. The provider 116 is not signed-in into the UES 100. Once the session 101 is created and conversation is initiated, through the phone gateway 102 a Short message is sent via the SMS Gateway 117 to the provider 116. The user 113 is informed of the SMS connection as opposed to an chat/instant message with provider 116. Here both the user 113 who is online and provider 116 who is on a mobile device can start texting each other although they can be in a completely different environment. In various embodiments the provider 116 can also be on a landline PSTN phone network or a VoIP phone network. All these embodiments highlight the instant access via a published URL (belonging to the provider 116) to an anonymous user 112 visiting a marketplace web page 111.

As part of the conversation that the UES 100 supports it can also allow the user 113 to initiate a voice call without having to know the phone number as the system 100 knows it and is residing in the provider database 105. Here the voice call is established using the phone gateway 102 through the VoIP gateway 118 to the provider mobile device 116. The voice session itself can be removed while in the conversation whereas the texting can continue. Either the user 113 or the provider 116 can choose to disconnect from the session at any point.

In another embodiment a user via the browser 113 in a device and from a web page 111 which in this case we can consider to be a marketplace site access the UES 100 via the Network 110. The provider 120 sought after is signed-in into the UES and hence the provider 120 is presented with a conversation window right on the browser 120 window at the site UES 100 site via the Web Server 103. Both the user 113 and provider 120 are in conversation, both being on the browser. Initially they exchange via text chat and the audio can be added and removed, also video can be added and removed. The provider 120 and the user 113 can also share other video streams in the conversation window supported by one embodiment of the UES 100. For video streams and other media sharing such as pictures the content storage 104 offered by the UES 100 can be used or also external content can be accessed based on the capabilities of the UES 100.

In all these embodiments we also see that any internet users 112, 113 with a single click on the published URL can instantly engage with the provider regardless of the device used by the provider without these users having to know the identity of the providers for initiating an engagement. We also see that the users 112, 113 and providers 116, 119, 120 need not be in any common user groups or networks. By instantly being able to generate URL 106 from UES 100 for their services/offerings, the providers 116, 119, 120 are quickly able to publish their contact identifier which is the URL in various web pages 111 and marketplaces 114. In some cases the web pages 111, 114 themselves via API 115 access UES 100 and acquire a URL for the providers.

In one embodiment the user executing a browser 112 on a device can be at a social network page 111 and in a profile of a person find the hyperlink for the URL that the person could have acquired earlier from UES 100 and then instantly engage with the owner of that URL which can be a provider 119 or 120 or 116.

In another embodiment a user could have received an email with an embedded hyperlink containing the URL acquired from UES 100. The user upon clicking the hyperlink in the email could be executing the browser 113 and engaging with the provider 119.

In another embodiment, based on the ability of the UES 100 system to generate session url for the provider, can notify this URL to the provider via SMS (or email via Email Gw 121) so that the provider 116 using a smart device can click the URL and transition to the browser 120 and access the same session and engage with the user 113. It will be up to the system 100 to either allow the provider 120 to view only this session or in fact allow for login to the provider's account and access all sessions along with engaging in the current session.

In an environment FIG. 1 where Users are executing browsers 112, 113 there are websocket connections from these browsers with the web server 103. Similarly websocket connections exists from browsers 120, 119 of the providers with the web server 103. A Web Socket connection is a full-duplex communication channel over a single TCP connection. This is an existing technology that increasingly browsers are beginning to use today. The Users 112, 113 upon clicking the URL first establish a https (Secure) connection with the Web Server 103 which also supports Web Socket and hence there is handshake between the Users 112, 113 and Web Server 103 that transitions the https connection into a secure Web Socket connection. This Web Socket connection is used to exchange control signaling information which can be of any chosen format with the Web Server 103. In one embodiment the control signaling information can be of JavaScript Object Notation. Similar exchange of control signaling exists between Web Server 103 and Providers 119, 120. However the connections are always initiated first by Users 112, 113 to Web Server 103 and similarly by Providers 119, 120 to Web Server 103.

While the control signaling always goes through the Web Server 103 the media such as voice packets can flow directly between User 112 and Provider 119 in one embodiment. There can be other embodiments when the media between Users 112, 113 and Providers 119, 120 can be intercepted and forwarded by other server entities 103. Overcoming firewall constraints at the user and provider premises using various security technologies are existing art and is assumed in this illustration FIG. 1 and other illustrations in this invention and for various embodiments described here as well as those that are not explicitly mentioned in this invention.

FIG. 2 illustrates various (although not restricted only to these 201-205) device and media combinations possible between user and provider devices for the engagement initiated by the usage of the URL by the User that had been generated by the provider in a particular context. Starting with a HTTP URL without any dependency or knowledge of the provider's identity nor the device nor any software dependency on the device of the provider, the user executing on a browser is able to engage with the provider on another device. The reference 201 indicates the combination where both the user and provider are executing a browser on their devices and all sorts of media is possible for this including text chat (instant messaging), voice, video, streaming and media sharing.

Whereas in 201 the provider was on a desktop or laptop in this 202 the provider is on a smart device such as a smart phone or a smart tablet. The user remains in either desktop or laptop or a smart device executing a browser.

The reference 203 is an embodiment where the provider is executing a smart app on the smart device that is able to interact directly with the UES 100 (FIG. 1). Here the smart app is a customized application that is able to interact with UES 100 and engage with users similar to what provider did with a browser. In all these embodiments 201, 202 and 203 the user and provider can perform all rich media interactions. In the embodiment 204 the provider is on a mobile device with access only to SMS and Voice. There is no internet connection for the browser or an application to interact with UES 100 (FIG. 1). In this embodiment the engagement with the provider is via texting and voice. For texting the UES 100 (FIG. 1) communicates with the mobile device via SMS and for Voice there is a call made to the phone number of the mobile device. This phone number was registered by the provider with UES 100 (FIG. 1) in the sign-up process.

In the embodiment 205 the provider had given a PSTN phone number which is a landline device and which cannot receive SMS. In this case the user can engage with the provider via a voice call. The UES 100 (FIG. 1) can be capable of realizing the absence of SMS capability for this phone number and inform the user the inability to communicate via SMS with the provider after which the user can add video to the conversation session.

Figure 3:
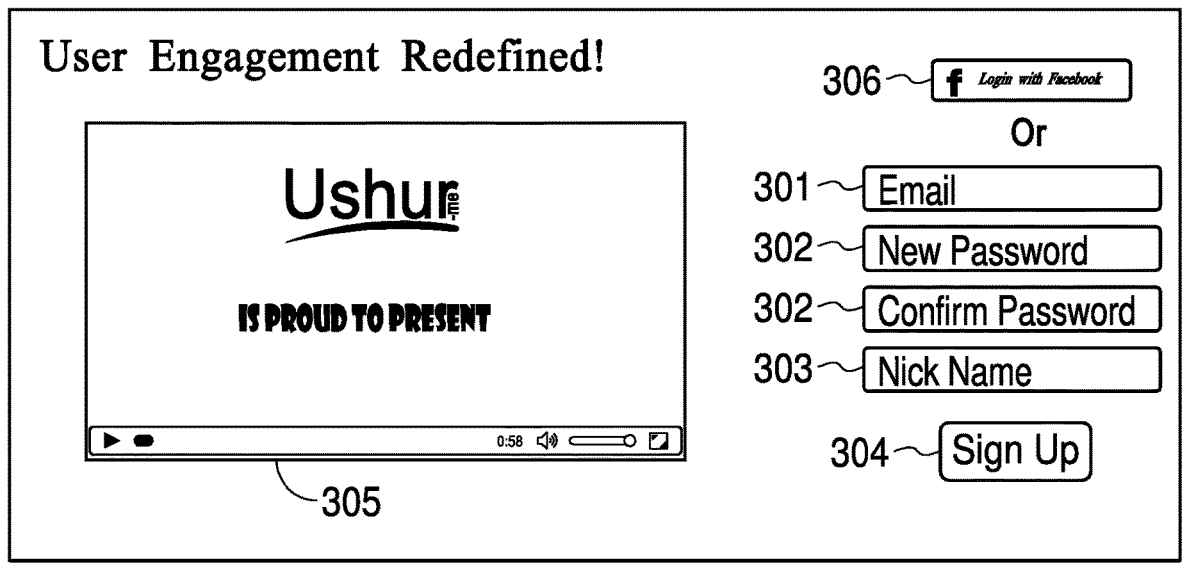
FIG. 3 illustrates a simple signup process to extract basic identity information and instantly generate a HTTP URL in accordance with an embodiment of the present invention.

FIG. 3 illustrates a sample sign-up user interface on a browser for a provider. In this the basic identity information such as a email 301, password and its verification 302 and a nickname 303 that can be used for displaying to the user and provider for reference are required from the provider.

The email 301 entered will have its backend verification such as is common in internet systems. It can involve a registration email being sent to that email and the provider confirming it. Another form of sign-up can also be via a pre-existing social network login 306 through which the UES 100 (FIG. 1) system can retrieve necessary identity information. The sign-up page can contain some form of introduction 305 to the provider who is signing-up or for anyone visiting the main web page of the UES 100 (FIG. 1) system. The UES 100 (FIG. 1) will ensure the email 301 entered is unique in the system and prompt the provider to supply that which is non existing in the system.

Figure 4:
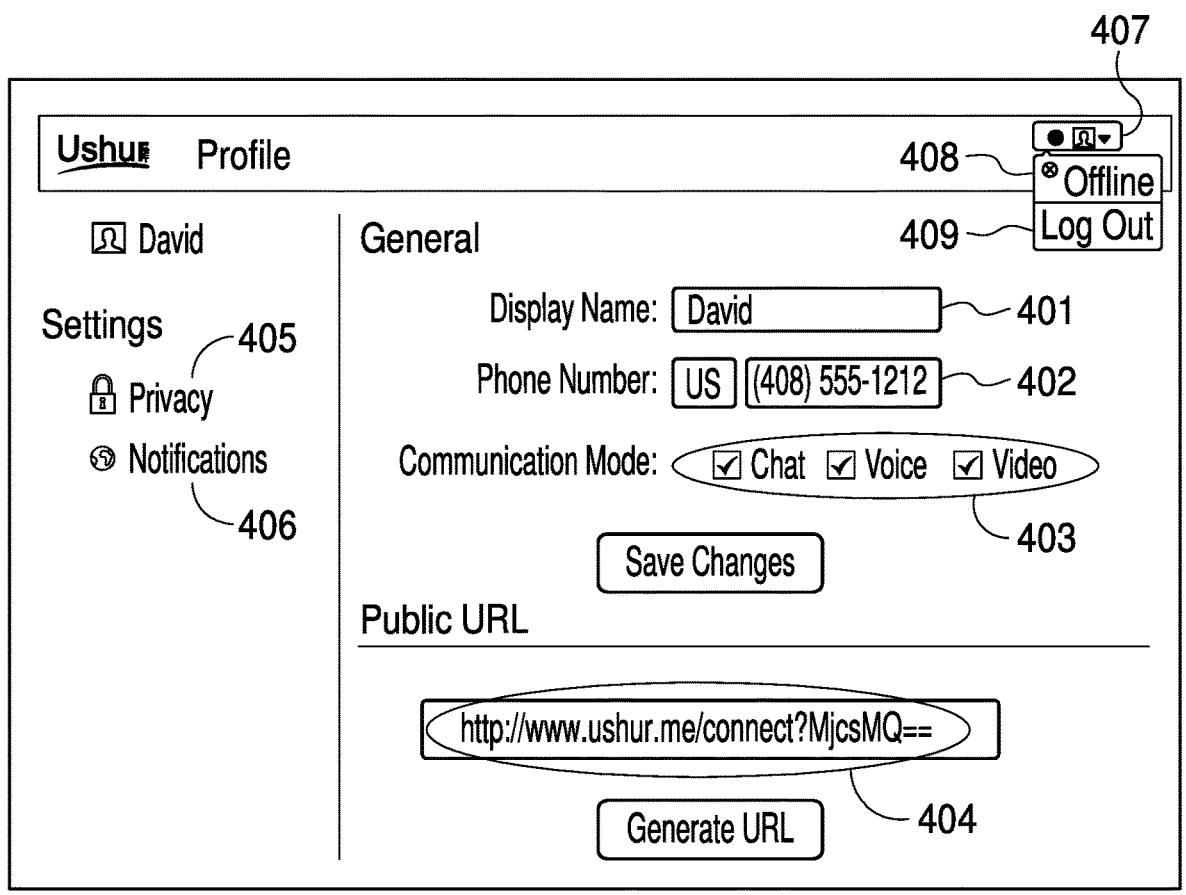
FIG. 4 illustrates a sample profile view of a provider along with the instantly generated HTTP URL in accordance with an embodiment of the present invention.

FIG. 4 illustrates a sample profile section for a provider who has signed-in into the system UES 100 (FIG. 1). The profile shows Display Name 401 that which was entered during sign-up and which can be changed anytime by the provider. The profile also shows Phone Number 402 that is optional for the provider to enter. If a phone number is entered then the system UES 100 (FIG. 1) will try to contact the provider, if not already signed-in into the UES 100 (FIG. 1), to the phone number via SMS and Voice as chosen by the user who is trying to engage with the provider using a generated URL 404. The modes of communication are given as options in 403 and which can be changed by the provider so that the user who is trying to engage with the provider will be allowed only these modes. Here in this embodiment 403 all the chat, voice and video is allowed by the provider although actual mode can be limited based on where the provider is reachable at a given time. This was illustrated in FIG. 2 device and media combinations.

The generated URL 404 is displayed in the profile and which the provider can copy anytime and use them in different context such as on a marketplace website 114 (FIG. 1).

The provider can generate URL 404 again after which in one embodiment the previous URL gets outdated. In another embodiment the UES 100 (FIG. 1) shall be capable of supporting multiple URL 404 for the same provider. Other aspects of the profile such as privacy 405 and notifications 406 of information is also presented to the provider. The provider although signed-in 407 can choose to go offline 408 so as to avoid receiving incoming requests. Anytime the provider can sign-in 407 again and receive incoming requests from users. The provider can sign-off/logout 409 out of the UES 100 (FIG. 1) after which the provider can still be contacted via the phone number 402 if given by the provider.

Figure 5:
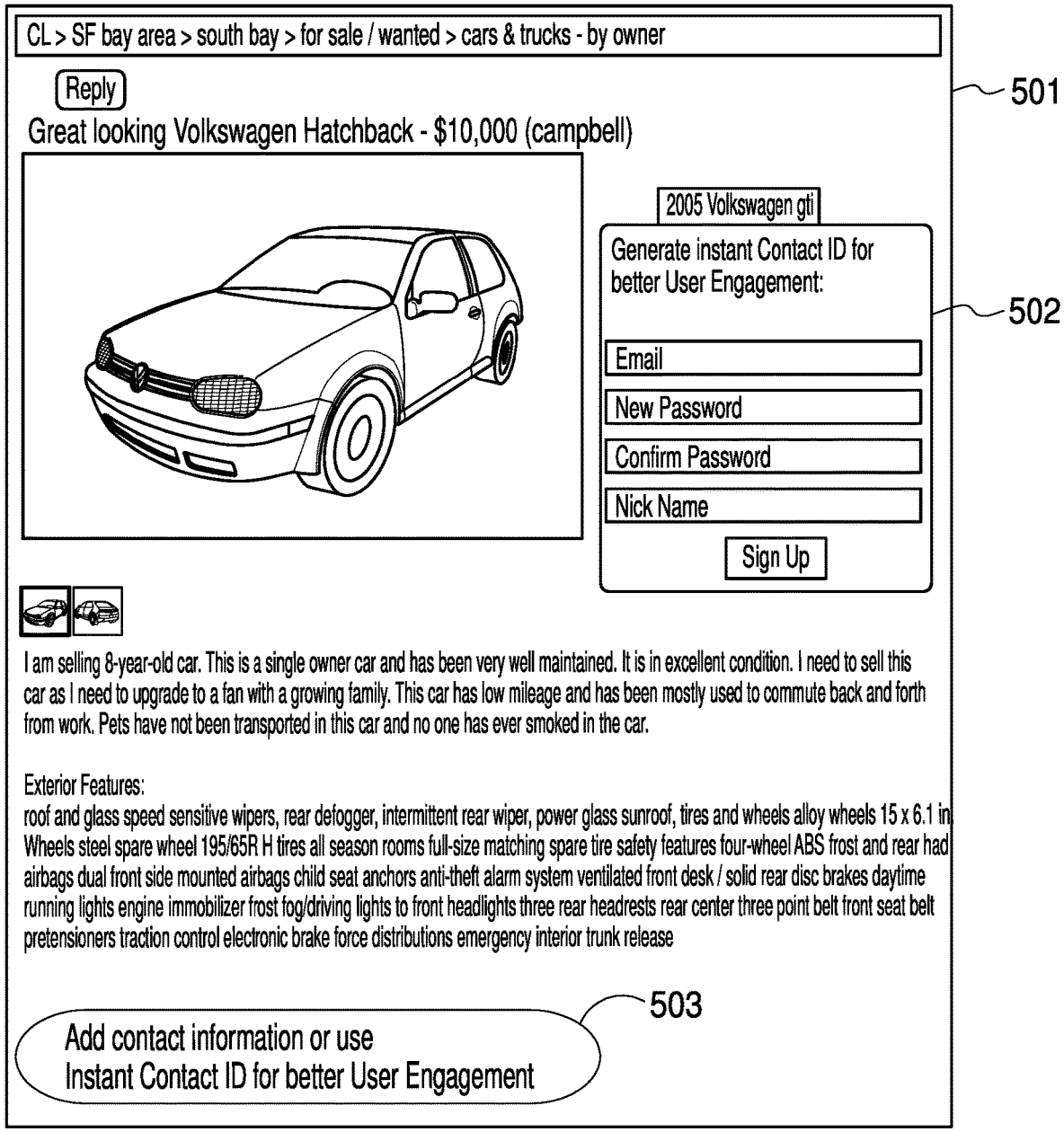
FIG. 5 illustrates an API based (in contrast to a Web UI) sign-up with the system in accordance with an embodiment of the present invention.

FIG. 5 is an illustration of a marketplace 501 (FIG. 1114, 115) where in this embodiment the marketplace is presenting the provider, who presumably does not have an account with UES 100 (FIG. 1), with a form and hence fills the form 502 presented which invokes an API (FIG. 1115) at the backend with the UES 100 (FIG. 1). The generated URL is retrieved via the API and gets displayed (FIG. 7, 702) on the same marketplace web page 501. The information requested by the form 502 need not be exactly as shown in this illustration but also can request phone numbers (FIG. 4, 402) which gets usually configured in the profile. Once the provider fills the form 502, the provider can also sign-in into the UES 100 (FIG. 1) using the same given credentials in the form 502.

Figure 6:
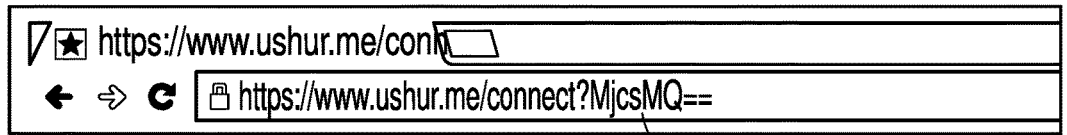
FIG. 6 illustrates one possible way to use the generated HTTP URL directly on a browser in accordance with an embodiment of the present invention.

FIG. 6 illustrates how an acquired URL 601 can be used in free form within a browser. This embodiment shows how a user who has this URL that is owned by a provider can use this URL directly on a browser and engage with the provider. The user could have access to this URL from an email received as part of a campaign by the provider in one embodiment, could have stored this URL in the contact maintained by a user for the provider in another embodiment. There are many other scenarios on how a user has handle to the URL owned by a provider.

FIG. 7 is an embodiment similar to that of the illustration in FIG. 5 except that here the provider who publishes this advertisement 701 in a marketplace, here trying to sell a car, actually has an acquired URL from the UES 100 (FIG. 1) and uses that URL directly 702 on the web page which allows hyperlinks to be embedded in the web page. This embodiment can be contrasted to that of the illustration in FIG. 5 where an acquired URL via the form 502 (FIG. 5) is retrieved via a backend API 115 (FIG. 1) and will be displayed similar to 702 here. A user who is a prospective buyer upon visiting this advertisement can engage with the provider via the link 702.

Figure 8:
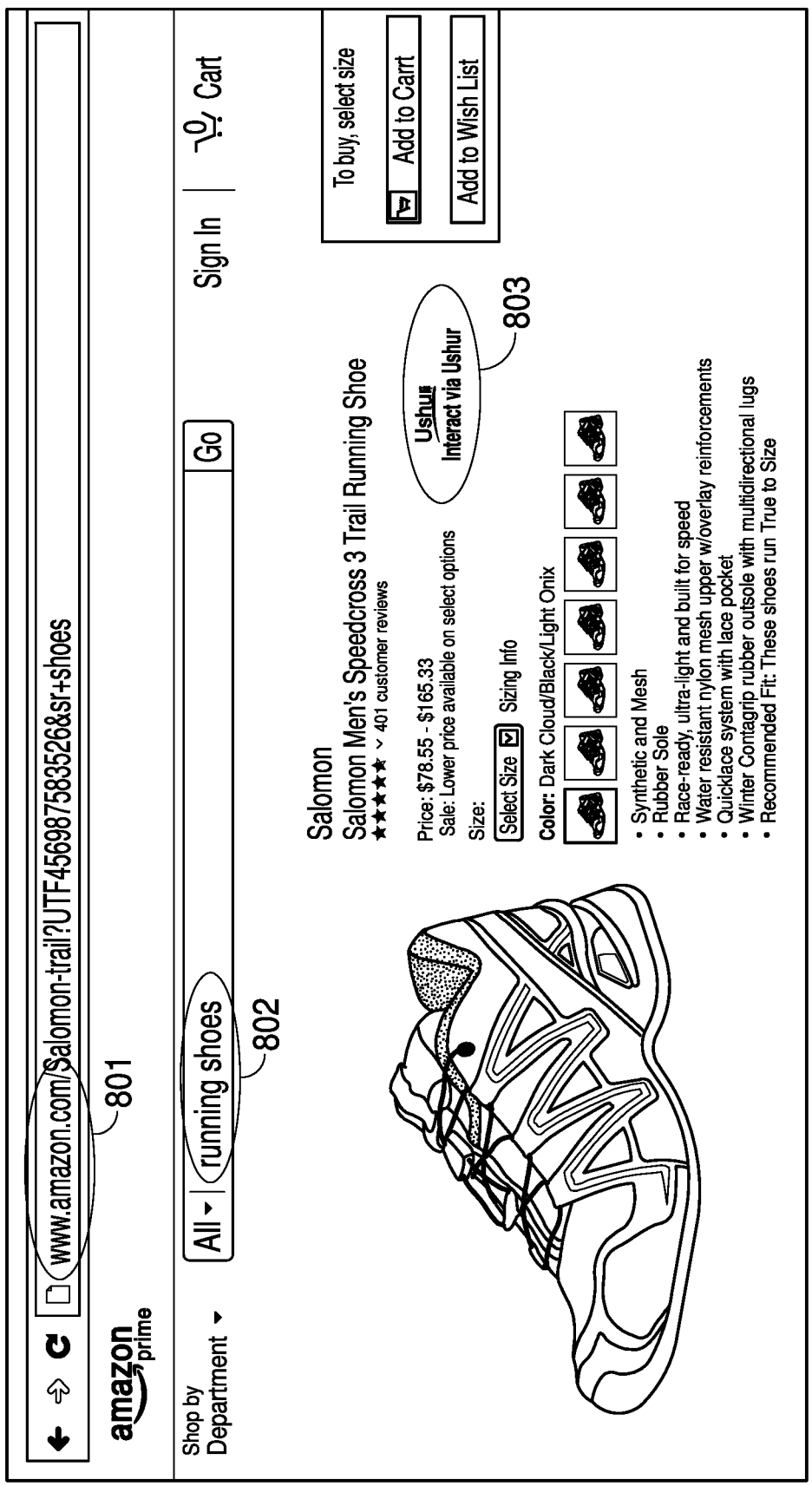
FIG. 8 illustrates another possibility of using the generated HTTP URL although behind an icon within a product advertisement web page in a marketplace in accordance with an embodiment of the present invention.

FIG. 8 illustrates another marketplace where as shown a user is interested in purchasing shoes and finds a link 803 to interact with the provider to have further inquiries in real-time. The provider has made prior arrangements with the marketplace vendor to display contacts for the provider, here being the link 803 to UES 100 (FIG. 1). This facility of using the links 803 can be something that provider brings to the marketplace or the vendor of the marketplace itself can offer to the provider, similar to the embodiments of FIG. 5 and FIG. 7 where in the FIG. 5 it was the marketplace vendor who displayed the form 502 for the provider to have a backend API 114, 115 (FIG. 1) interaction and FIG. 7 (702) it was the provider who brought the link into the advertisement.

Figure 9:
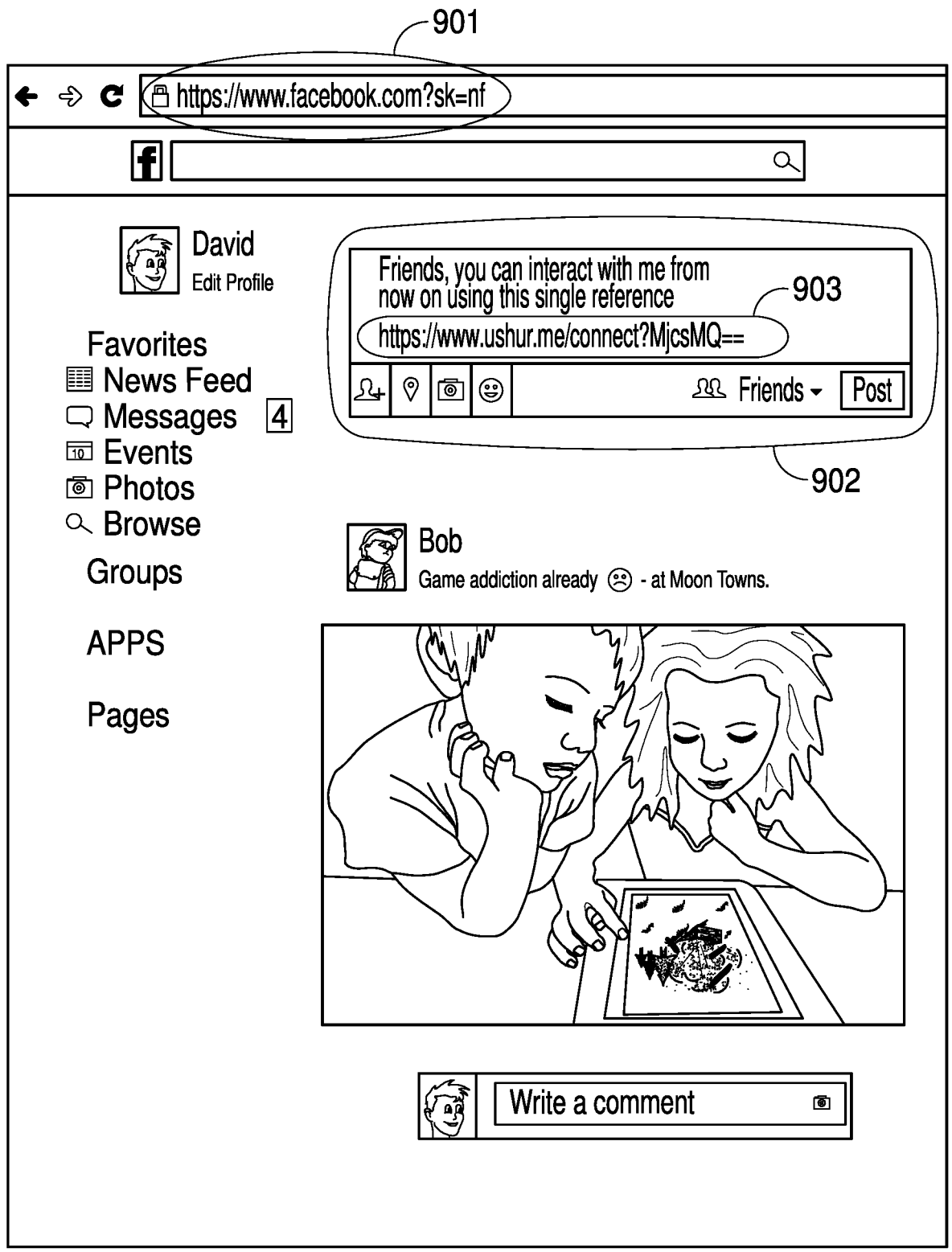
FIG. 9 illustrates the usage of the generated HTTP URL in a social network context in accordance with an embodiment of the present invention.

FIG. 9 illustrates another embodiment where the URL 903 link for a provider is being posted either by the provider in one embodiment or by someone else in another embodiment into a social network web page. There can be various other embodiments where a social network has infrastructure to allow providers of various services to place advertisement in relevant sections of their web pages and these service providers advertise such URL 903 for the users in social network to engage with them. It is important to note that URL do not have to be exposed as in 903 but can be within images as illustrated in 803 (FIG. 8).

Figure 10:
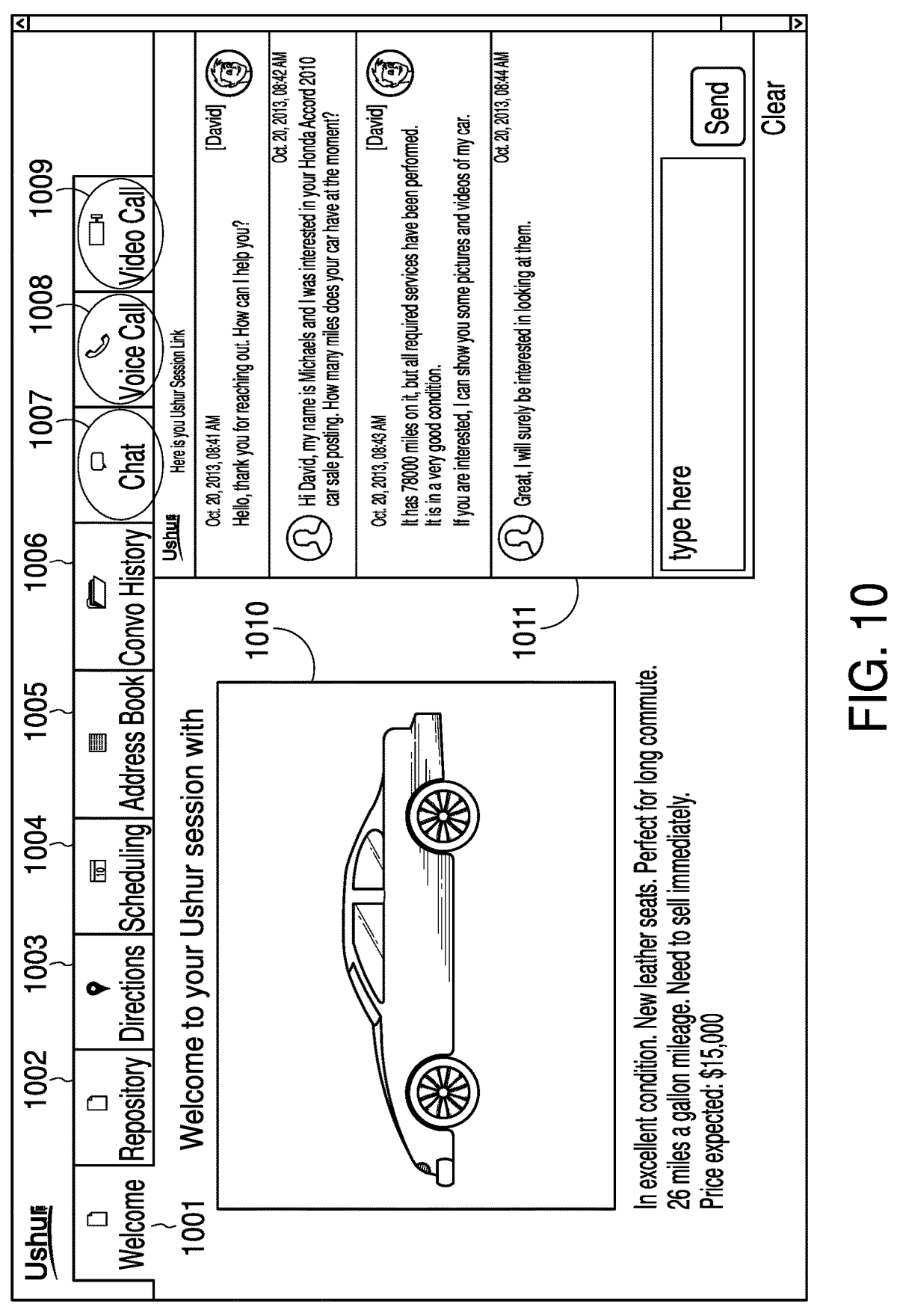

FIG. 10 illustrates a conversation window for the engagement between a user and a provider. This is one specific rendering supported by the UES 100 (FIG. 1). The layout shown can be similar for the user and provider although in one embodiment the provider has more controls whereas in another embodiment it is possible that user has more controls. However all these will be configured by the provider in the UES 100 (FIG. 1). In this specific illustration we can see that there is a welcome page 1001, various other sharing tabs such as repository 1002, directions 1003, scheduling 1004, address book 1005 and conversation history 1006. The modes shown in this illustration are Chat 1007, Voice Call 1008 and Video Call 1009. Typically it is the user who initiates the engagement starting from the URL and hence can start adding Voice 1008 and Video 1009 to the conversation. In this embodiment the engagement starts with the Chat 1007 and can continue along with other modes such as Voice 1008 and Video 1009. In this embodiment we can see that the page 1010 displays the advertisement such as 701 (FIG. 7) so that both the provider and user are aware of the context of the conversation. In another embodiment the provider can describe parts of the car in more detail in real-time with the Video (Webcam) 1009 which the user could not have seen in an advertisement 701 (FIG. 7).

Figure 11:
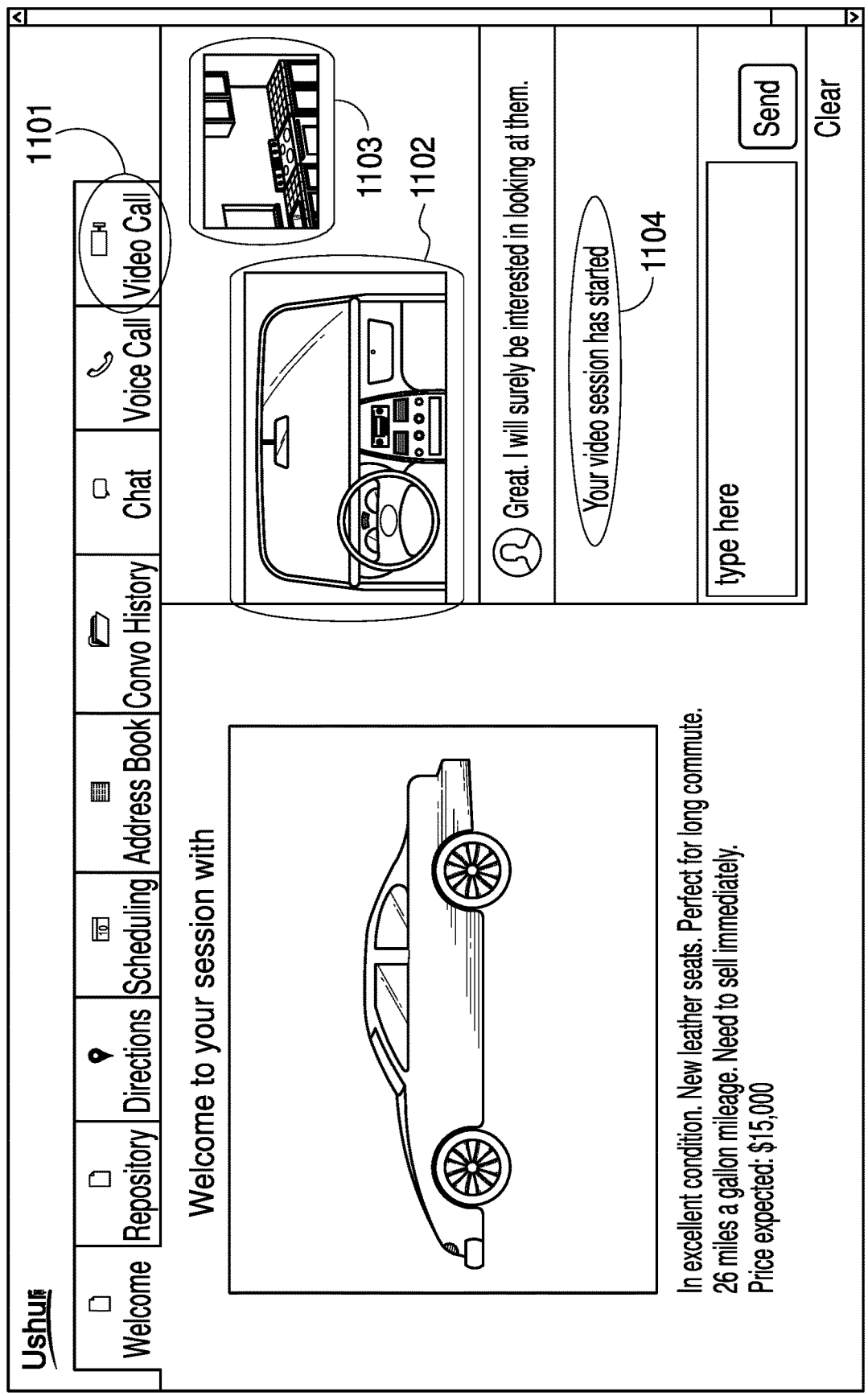
FIG. 11 illustrates the conversation window with integrated video as part of the user engagement with the provider using the generated HTTP URL for the provider in accordance with an embodiment of the present invention.

FIG. 11 is a continuation of FIG. 10 where in this embodiment the provider shares in real-time the video 1102 of the car 1010 (FIG. 10). This illustrates the importance of a real-time engagement that the provider can leverage and assist the prospective buyer in addressing the questions that cannot be achieved in a static advertisement page 701 (FIG. 7)

Figure 12:
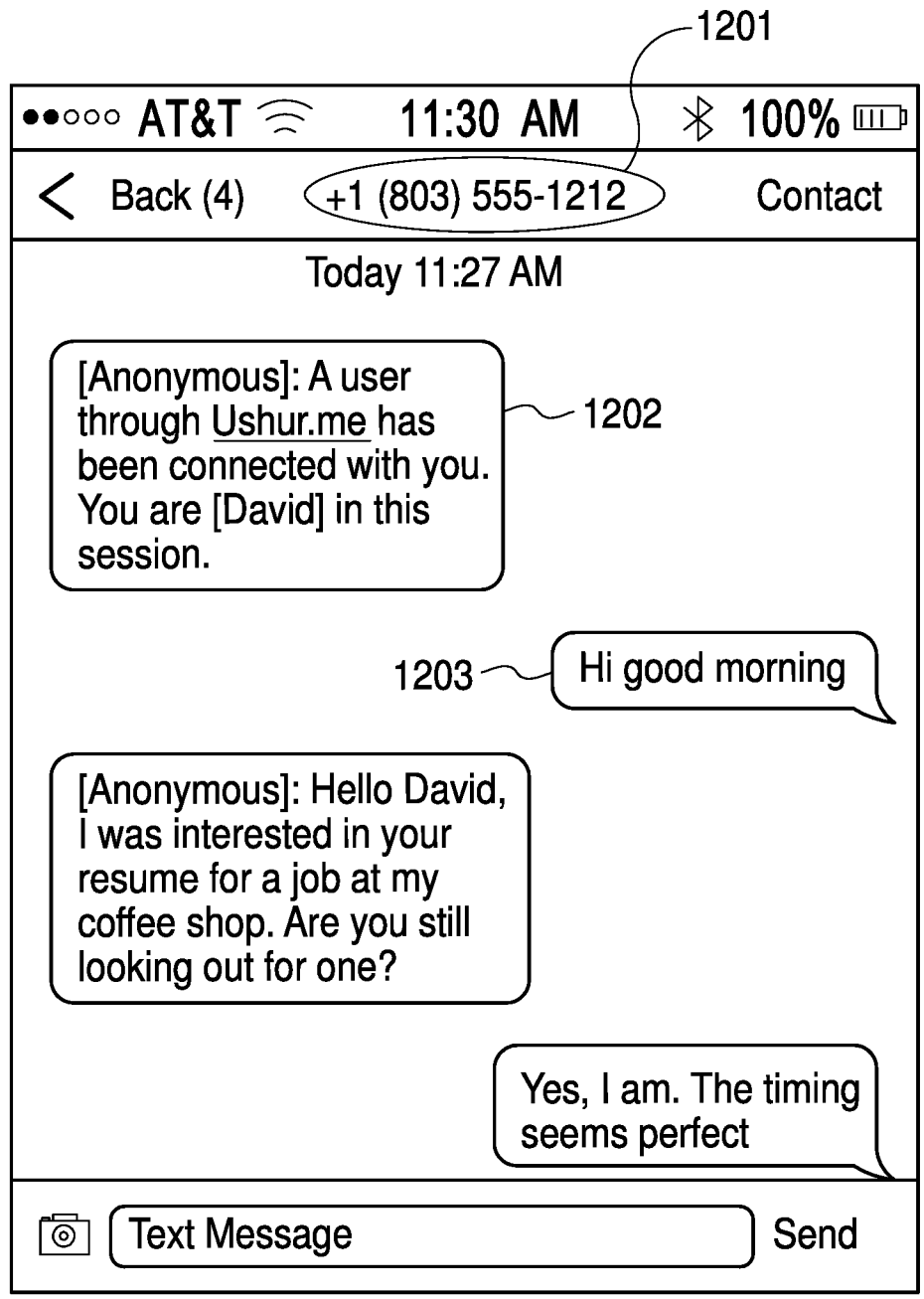
FIG. 12 illustrates the SMS interaction on the provider's mobile device when an anonymous user engages with the provider using the generated HTTP URL in accordance with an embodiment of the present invention.

FIG. 12 illustrates the SMS mode of engagement by the provider. When the user clicks on a URL such as in 702 (FIG. 7), the user lands in a conversation window where the user can type in text on the chat window 1007 (FIG. 10). This text 1203 (FIG. 12) along with an initial header message 1202 appears on the device of the provider receiving the SMS. The text that provider types such as 1203 will appear on the chat window 1007 (FIG. 10) for the user. The calling number 1201 on the provider device can already be configured as a service number in a contact of the address book so that the provider knows that this SMS originates for a service. The information in the initial header message 1202 helps provider to be aware of the context of this SMS.

Figure 13:
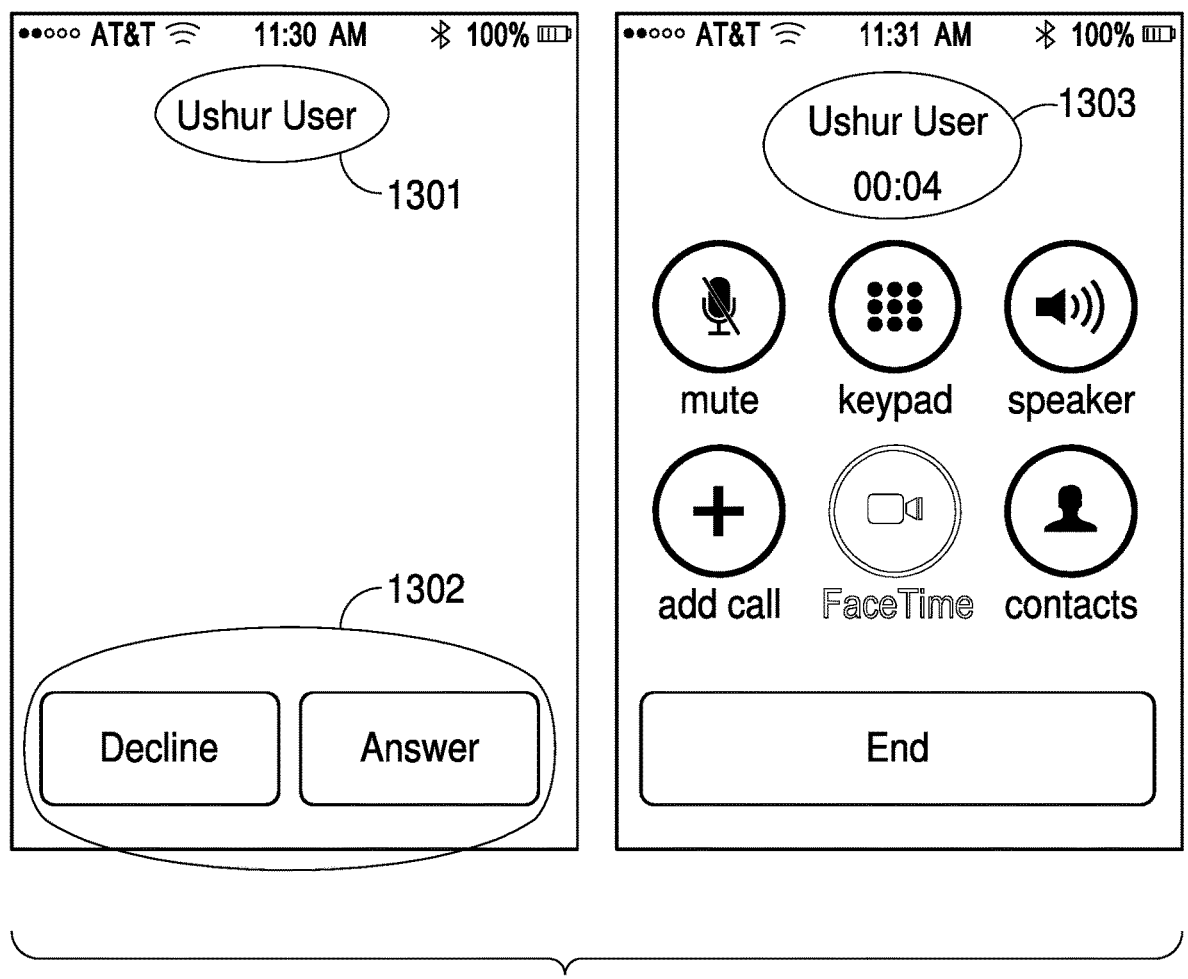
FIG. 13 illustrates provider receiving a phone call on the mobile device when an anonymous user engages with the provider using the generated HTTP URL and adds voice to the conversation in accordance with an embodiment of the present invention.

FIG. 13 illustrates an incoming call on the device of the provider. The calling number which the provider can know in one embodiment based on the capabilities of the UES 100 (FIG. 1), can be configured as a contact 1301,1303 in the device of the provider. A user on the conversation window can add voice 1008 (FIG. 10) to the conversation along with the ongoing chat which is SMS on provider's device and that voice shows up as an incoming call 1302 on the provider's device.

Figure 14:
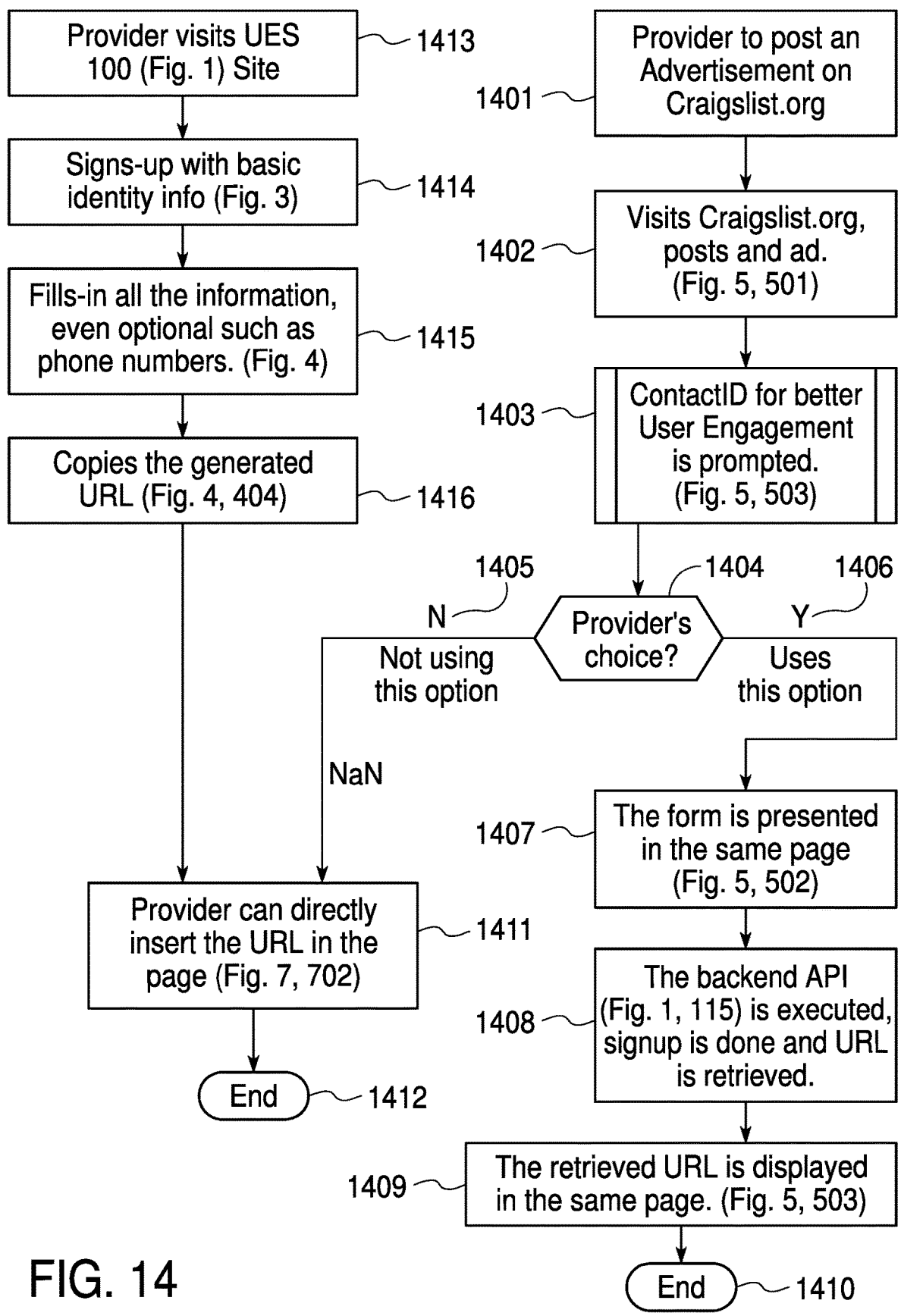
FIG. 14 is a flowchart illustrating the steps involved for a provider to post an ad in craigslist.org incorporating the generated HTTP URL for interested users to engage with the provider in accordance with an embodiment of the present invention.

FIG. 14 flowchart illustrates the steps involved for a provider to post an advertisement in a marketplace such as craigslist.org using the generated URL acquired from UES 100 (FIG. 1). In one embodiment 1413 the provider visits the UES 100 (FIG. 1) site, signs-up there and gets access to the URL that the provider now owns. This provider visits the marketplace such as craigslist.org in this embodiment and posts an advertisement 1402. In that web page the provider is requested (1403) if there is a need for a Contact ID towards a better user engagement with his clients. This provider in one embodiment declines (1405) as the provider already has a URL and intends to use it. The provider inserts the already acquired and owned URL (1416) into the web page (1411) and it appears like 702 (FIG. 7) in one embodiment but it can appear within an icon as well such as shown in 803 (FIG. 8) in another embodiment. If the provider chooses to use the web page option 1403 to instantly acquire another URL, the provider can enter a different identity on the form 1407 such as a different email address that the provider owns and using the backend API 1408 the marketplace webpage fetches a new URL 1409 for the provider which gets posted on the webpage. In another embodiment based on the capability of the UES 100 (FIG. 1) and hence the API 1408 the provider can enter the same information which the provider uses to sign-in into the UES 100 (FIG. 1) system and here acquire a different URL 1409. In one embodiment the UES 100 (FIG. 1) is capable of generating new URL and replacing older ones and in another embodiment it can even support multiple active URLs for a provider.

Figure 15:
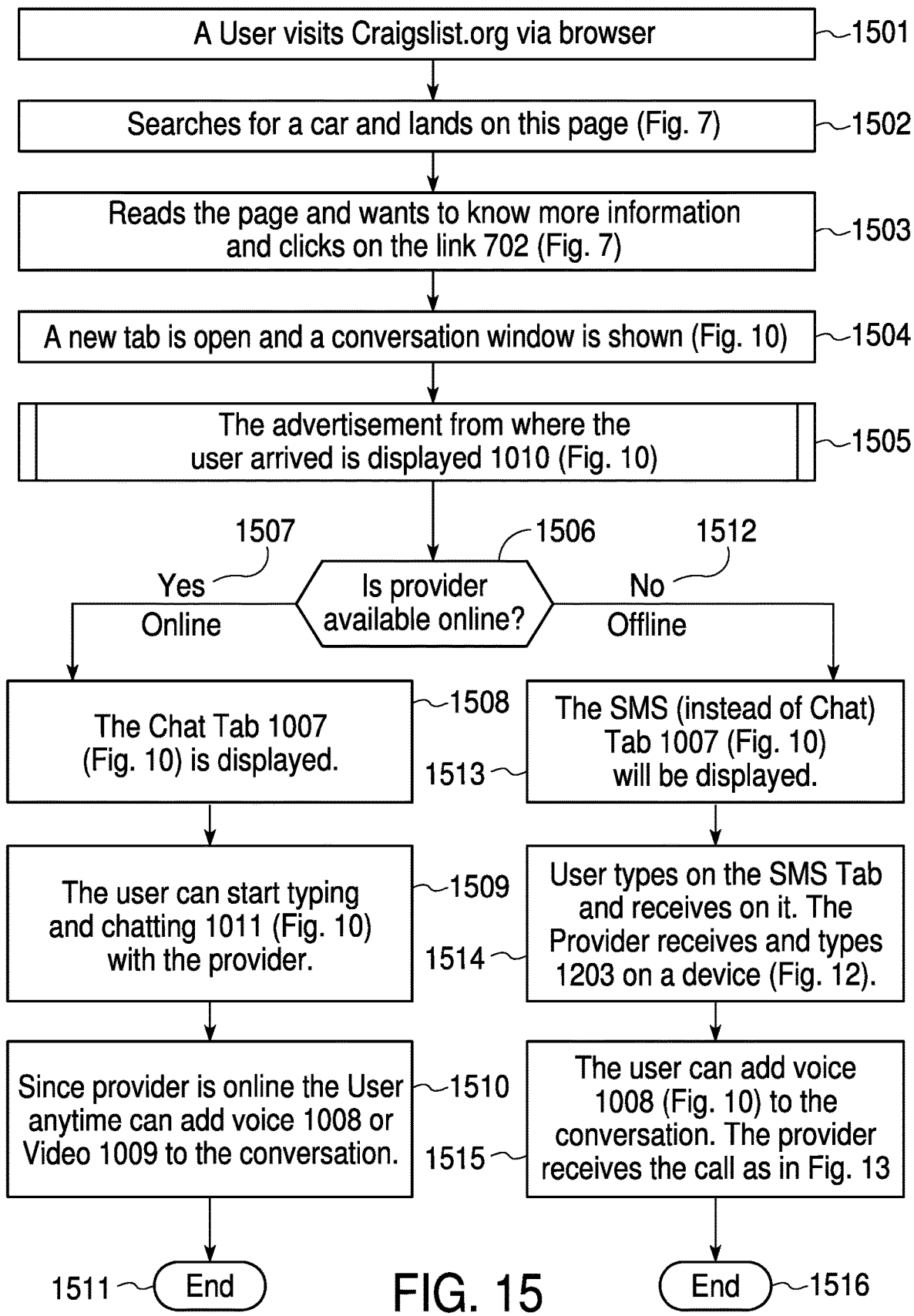
FIG. 15 is a flowchart illustrating the steps taken by a user visiting the craigslist.org site and using the posted HTTP URL engaged with the provider in accordance with an embodiment of the present invention.

FIG. 15 illustrates a user visiting 1501 the marketplace and engaging with the provider through the system UES 100 (FIG. 1) which is one embodiment of a system that is necessary to support the methods and mechanisms that is presented in this invention.

After searching and finding an advertisement 1502 the user goes through the advertisement page and has more inquiries and hence clicks 1503 the displayed URL 702 (FIG. 7) which initiates a new conversation window 1504. In order to keep the user aware of the context in one embodiment the conversation window displays the web page 1505 that the user arrived from which here is the advertisement posted by the provider. If the provider is online 1507 and signed-in into the system UES 100 (FIG. 1) then a Chat Tab 1508 is displayed to the User. The user shall start engaging with text chat 1509 and then later add and remove voice and video 1510 to the same conversation with the provider. If however the provider is offline 1512 the user is presented with a SMS Tab 1513 and the user can start engaging 1514 with text chat although the provider is on a mobile handset in one embodiment. Based on their mutual understanding the user can initiate a voice 1515 with the provider while they can continue to chat both ways. What this illustrates is that, with a click of a URL the user is able to experience an engagement with the provider regardless of the location of the provider.

Figure 16:
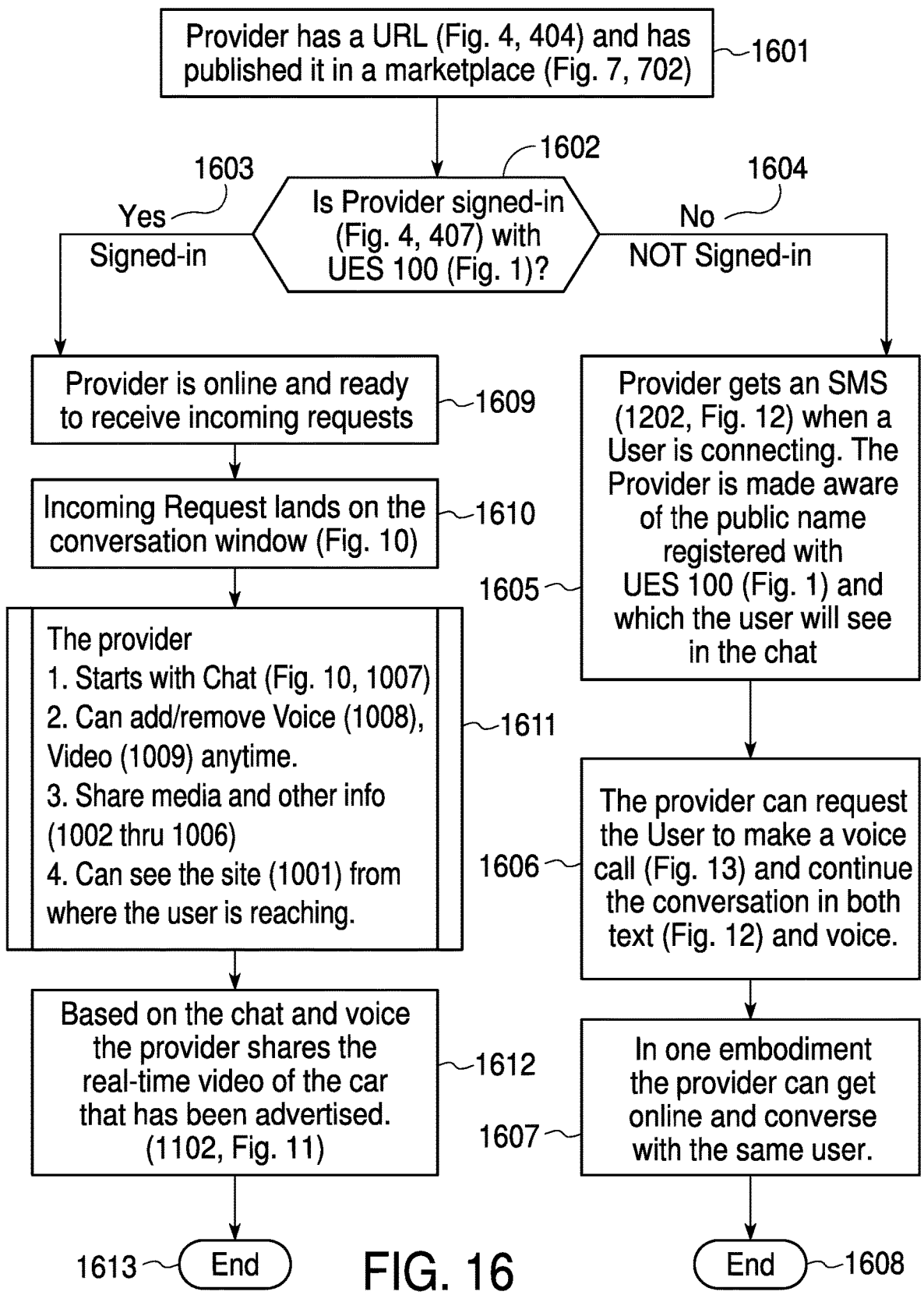
FIG. 16 is a flowchart illustrating the actions of a provider for an incoming engagement request from a user in accordance with an embodiment of the present invention.

FIG. 16 illustrates how a provider handles an incoming request through a published URL in a marketplace 1601. The experience for the provider depends on whether the provider is signed-in into the system UES 100 (FIG. 1) or not. When signed-in and ready to receive incoming requests for engagement 1609 the provider is given a conversation window 1610 for an incoming request. In one embodiment the provider can receive only one outstanding request whereas in another embodiment based on the capabilities of the UES 100 (FIG. 1) the provider can simultaneously be given more than one incoming request and hence more than one conversation window. On the conversation window the provider can start 1611 text chat, add and remove voice and video and in one embodiment be able to see the web page from which the user is calling so that the provide can be aware of the context of the incoming request. Based on the interaction and the need for the user the provider can share some real-time videos 1612 with the user. If however the provider is not signed-in into the system 1604 the provider gets an SMS 1605 on a device with phone number 402 (FIG. 4) that the provider has configured with the system UES 100 (FIG. 1). In this SMS based on the capabilities of the UES 100 (FIG. 1) additional information such as the public name of the provider shall be presented so as to make the provider aware of the context of the SMS. In one embodiment the provider could have stored the calling number 1201 (FIG. 12) of the SMS as a Contact and hence a name 1301 (FIG. 13) shall appear instead of the phone number so that the provider knows the SMS context. While the text chat continues with user on the internet and provider with a SMS capable device, the user can initiate a voice call 1606 to the same device that the provider is using and they both can now continue with voice as well as chat. Based on the capabilities that UES 100 (FIG. 1) offers the provider can get online and continue the engagement with the user. This illustrates various options and flexibility that the provider has in being engaged with a user who starts with a URL 702 (FIG. 7) found in a marketplace.

The invention presented here incorporates several embodiments and it should be evident for those skilled in the same art that various other embodiments are possible and can be practiced. Various components within UES 100 (100 thru 106, 121) referred in the main illustration FIG. 1 are used to convey one form of implementing the overall solution that is required to support the invention presented here. Using similar components or a combination of these alternate ways of implementing the solution presented in this invention can be achieved. Other external components such as SMS Gateway 117, VoIP Gateway 118 can manifest themselves either as a single or multiple components in different embodiments. In summary the components within UES 100 and those outside such as SMS Gateway 117, VoIP Gateway 118 can exist in different forms and combinations and can all be software-based components or some of them can also exist as hardware components.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of the session manager 101, URL Generator 106, Phone No Gateway 102, and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "clicking" or "texting" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple process or designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A system enabling engagement between providers and customers, the system comprising:
   a web-based user engagement server (UES) that provides an interface for the providers and the customers to engage in real-time multi-modal interactions, wherein the providers offer products or services to be potentially bought by the customers;
   a provider database coupled to the UES that stores basic contact information collected from the providers;
   a URL generator in the UES that generates respective globally unique Uniform Resource Locators (URLs) for each of the providers for one or more specific sessions of engagement with each of the customers;
   a session manager in the UES that manages a specific session that is automatically initiated as a result of a specific customer engaging with a specific provider utilizing the specific provider's globally unique URL, wherein the specific session is a full-duplex communication session established with a device of the specific customer by an ephemerally generated session URL;
   a content storage coupled to the UES that stores session-related information for the specific session;
   a phone number gateway in the UES that delivers the specific customer's messages to the specific provider's phone; and
   an email gateway in the UES that delivers the specific customer's messages to the specific provider's computer.

2. The system of claim 1, wherein the system is a portal to an online marketplace for the providers to sell the products and services to the customers.

3. The system of claim 1, wherein the URL generator generates the globally unique URL for a specific provider based on the basic contact information collected from the specific provider.

4. The system of claim 3, wherein the URL generator further generates the session URL, based on the globally unique URL, to establish the full-duplex communication session with a customer's device.

5. The system of claim 1, wherein the basic contact information collected from a provider comprises a display name, at least one email address and at least one phone number.

6. The system of claim 5, wherein the email gateway registers the at least one email address.

7. The system of claim 5, wherein the phone number gateway registers the at least one phone number.

8. The system of claim 1, wherein the web-based UES provides the interface for engagement between the providers and the customers via a web browser or an application on a computer or a mobile device.

9. The system of claim 1, wherein the provider database stores the generated URLs.

10. The system of claim 1, wherein the content storage stores respective media information associated with respective providers.

11. The system of claim 10, wherein respective media information includes one or more of audio, video and images.

12. The system of claim 1, wherein the session manager aggregates all the real-time multi-modal interactions between a specific provider and a specific customer.

13. The system of claim 12, wherein the multi-modal interactions include interactions via one or more of chat, SMS, phone audio, computer audio, video, and email.

14. The system of claim 13, wherein a mode of interaction at a provider's end can be the same or different from a mode of interaction at a customer's end.

15. The system of claim 14, wherein the session manager allows flow of information between the provider and the customer regardless of whether the mode of interaction at the provider's end matches with the mode of interaction at the customer's end.

16. The system of claim 13, wherein the phone number gateway manages protocol interworking associated with converting chat messages from a customer into SMS for the provider, and converting the audio streams from a customer to a Public Switched Telephone Network (PSTN).

17. The system of claim 1, wherein the system is aware of a presence of a provider regardless of a mode through which the provider is present.

18. The system of claim 17, wherein the system tracks a current mode of the presence of the provider, and delivers a customer's message to the provider based on a policy configured in the system to determine a priority of delivering the customer's to particular modes when the provider is present in multiple modes.

19. The system of claim 1, wherein during the session, a provider can switch from one mode to another mode to maintain the real-time multi-modal interaction with a customer.

20. The system of claim 1, wherein the generated URL indicates a preferred mode of interaction for a provider.

* * * * *